United States Patent [19]

Hiltebrandt

[11] Patent Number: 4,903,133
[45] Date of Patent: Feb. 20, 1990

[54] OCULAR ATTACHMENT FOR AN ENDOSCOPE

[75] Inventor: Siegfried Hiltebrandt, Knittlingen, Fed. Rep. of Germany

[73] Assignee: Richard Wolf GmbH, Fed. Rep. of Germany

[21] Appl. No.: 257,518

[22] Filed: Oct. 14, 1988

[30] Foreign Application Priority Data

Oct. 15, 1987 [DE] Fed. Rep. of Germany ....... 3734917

[51] Int. Cl.⁴ .............................................. H04N 7/18
[52] U.S. Cl. ...................................... 358/225; 358/98
[58] Field of Search ......................... 358/224, 225, 98; 128/4, 6

[56] References Cited

U.S. PATENT DOCUMENTS

| | | | |
|---|---|---|---|
| 4,439,030 | 3/1984 | Ueda | 358/98 |
| 4,625,714 | 12/1986 | Toyota et al. | 358/98 |
| 4,755,873 | 5/1987 | Kobayashi | 358/98 |
| 4,769,698 | 3/1987 | Ledley et al. | 358/225 |

FOREIGN PATENT DOCUMENTS 0087033  5/1986  European Pat. Off. .
2728419  1/1979  Fed. Rep. of Germany .

*Primary Examiner*—Jin F. Ng
*Assistant Examiner*—Stephen Brinich
*Attorney, Agent, or Firm*—Hill, Van Santen, Steadman & Simpson

[57] ABSTRACT

An ocular attachment for an endoscope, in which the endoscopic image may be split into two images in each case by several adjacently positioned beam splitter elements which are displaceable transversely to the image axis, to which end, the one image may be transmitted to a first camera connector along the image axis acting as a first optical axis, and the other image may be transmitted to a second camera connector via an image ductor along a second optical axis. The degree of brightness of these two images may be adjusted by the beam splitter elements having different divisional ratios and held by a mounting, by placing one of the beam splitter elements in the beam path of the endoscopic image in each case, by displacing the mounting. An arrangement is also provided for supplying an undivided endoscopic image at will to the first or second camera connector.

12 Claims, 1 Drawing Sheet

OCULAR ATTACHMENT FOR AN ENDOSCOPE

BACKGROUND OF THE INVENTION (a) Field of the Invention

This invention relates to an ocular attachment for an endoscope, in which the endoscopic image may be split into two images by means of one in each case of several beam splitter elements arranged one beside another and displaceable transversely to the image axis, the one image being transmissible to a first camera connector along the image axis acting as a first optical axis and the other image being transmissible to a second camera connector via an image conductor along a second optical axis, and wherein the brightness of both images is adjustable by means of the beam splitter elements carried by a mount and having different divisional ratios, by virtue of the fact that one of the beam splitter elements may in each case be located in the beam path of the endoscopic image by displacing the mount.

(b) Description of the Prior Art

An ocular attachment of this nature has been disclosed more than once in patent literature. Thus the specification of EP-B No. 087033 discloses a twin observation system comprising a television camera connector in an ocular section forming a principal optical axis and a second optical axis. The observation system has a beam splitter formed by two beam splitter elements alternately pivotable into the beam path of the endoscope, which in each case have different light division ratios. This system allows for deflecting a part of the incident light out of the main optical axis and for supplying the same to the ocular section on which a photographic instrument for example may be installed. To this end, the beam splitter elements are so constructed that 50% or 70% of the incident light is supplied to the ocular section.

Moreover, the specification of DE-OS No. 27 28 419 discloses an ocular attachment devised for an endoscope, which is a component of a co-observation system, in particular of a segmental optical system, such an ocular attachment comprising a casing for a co-observer and incorporating a beam splitter for this purpose. The latter comprises two beam splitter cubes arranged side by side within the casing, which may in each case be placed alternately in the beam path of the endoscope.

In the case of these ocular attachments, the beam path branched off in each case has supplied to it an image which corresponds to the main beam path in respect of image brightness or is substantially brighter than the same, so that a documentation device, being a photographic camera for example, had been attachable in the branch beam path only. A possibility of this kind did not exist for the direct beam path since the image directed through the same was of lesser brightness only.

SUMMARY OF THE INVENTION

The main object of the present invention is to provide an ocular attachment which is improved in respect of its possibilities of application and which is functionally reliable.

The present invention consists in an ocular attachment for an endoscope, in which the endoscopic image may be split into two images by means of one in each case of several adjacently positioned beam splitter elements displaceable transversely to the image axis, the one image being transmissible along said image axis acting as a first optical axis to a first camera connector and the other image being transmissible to a second camera connector via an image guide or conductor along a second optical axis, to which end the degrees of brightness of both images are adjustable by means of the beam splitter elements having different divisional ratios and secured in a mounting or holder, one of the beam splitter elements being apt to be positioned in each case in the beam path of the endoscopic image by displacing the mounting, characterised in that means are provided for supplying an undivided endoscopic image optionally to the first or second camera connector.

In a preferred embodiment of the invention provision is made for the endoscopic image to be transmissible under total transmission to the one camera connector in one position, and for the same to be transmissible to the other camera connector under total reflection by means of a deflector element, in another position.

The possibility is established thereby that an image of optimum brightness may alternately be supplied to the two beam paths alternately in each case, which is required for example if the implementation of an endoscopic intervention is to be checked by means of a permenently installed colour video camera and if, for example, a photographic exposure is to be taken every instant during said intervention by means of a second documentation device, without having to interrupt the intervention and to connect the documentation device required in each case, which yields the supplemental advantage that the sterile nature of said intervention is not put at risk.

In another preferred embodiment of the ocular attachment according to the invention, the deflector element is situated at one extremity of the mounting, whereas a clear passage element is arranged at the other extremity of the mounting and the deflector element or the passage element may optionally be located in the path of the endoscopic image by corresponding displacement of the mounting. To this end, the mounting may carry three beam splitter elements which are situated between the deflector element and the passage element, the ratios between transmission and reflection, starting from the passage element, via the beam splitter elements as far as the deflector element inclusive of the latter, having at least approximately the following values, namely 100/0, 90/10, 50/50, 10/90 and 0/100.

For the purpose of securing the mounting in a releasable manner at the position selected in each case, the same may be provided with a spring-biassed automatically operating detent element. The setting of the beam splitter system or rather of the mounting may advantageously be established by the fact that the beam splitter system or rather its mounting is acted upon in each case by a guided push-rod as a handle or lever for the linear displacement of the beam splitter system. Finally, the image conductor may be constructed as a segmented optical system, which, apart from satisfactory optical transmission qualities, ensures a high degree of mobility and which at the extremities of the beam paths has ocular cones which may act as camera connectors.

BRIEF DESCRIPTION OF THE DRAWINGS

In order that the invention may be more readily understood, an embodiment thereof will now be described, by way of example, with reference to the accompanying drawings, in which.

DESCRIPTION OF THE PREFERRED EMBODIMENT

Figure 2:
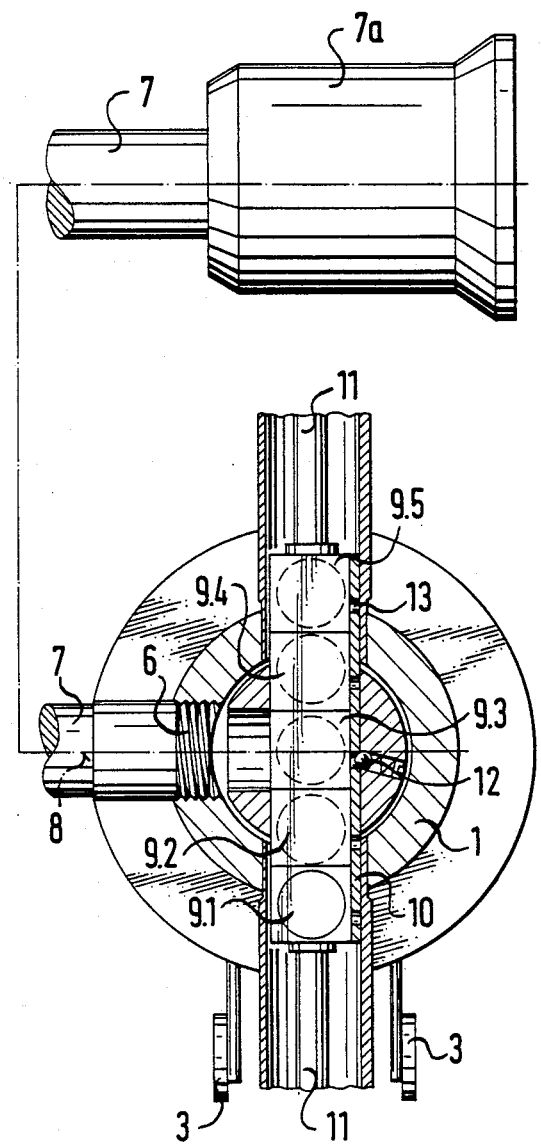
FIG. 2 is a cross-sectional view through the ocular attachment taken along the line I—I of FIG. 1.
Figure 1:
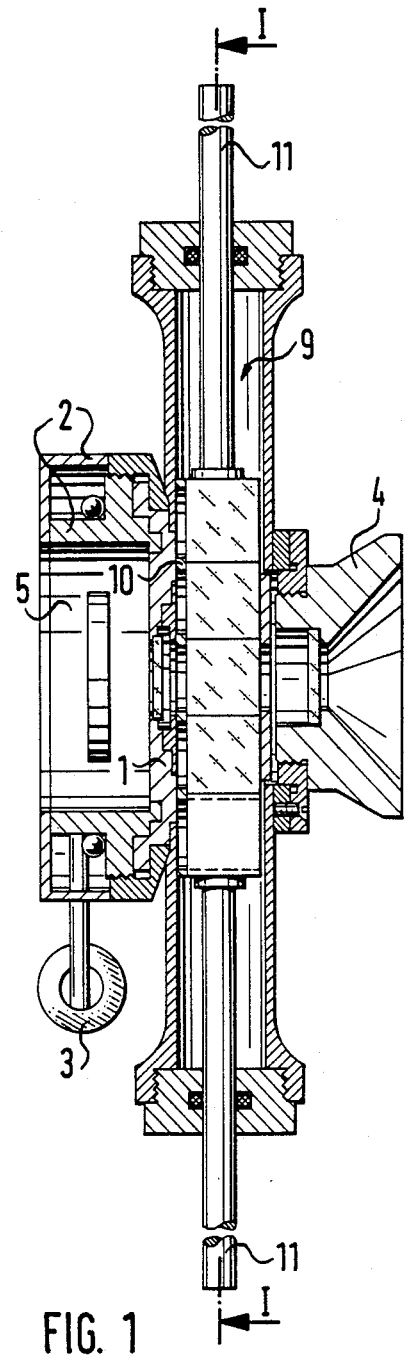
FIG. 1 is a longitudinal cross-section view through an ocular attachment, constructed in accordance with the invention.

Referring to FIG. 1, the ocular attachment constructed according to the invention comprises a casing 1 which may be coupled by means of a clamping joint 2 or the like, to an endoscope or to a separate endoscope optical system, a releasable connection between these elements being established by pressing together two handles or levers 3 provided on these. At the proximal side, the casing 1 is provided with an ocular cone or funnel 4 whereof the axis forms a first optical axis 5 with that of the clamping joint 2 and on which a camera may be installed. According to FIG. 2, the casing 1 also has a lateral connector 6 for reception of a segmented optical system 7 comprising an eyepiece cone 7a.

The ocular-side extremity of the casing 1 serves the purpose of fitting a first documentation device, for example a colour video camera. The axis of the lateral connector 6 forms a second optical axis 8 which intersects the first optical axis 5 at right angles and which may consequently be positioned outside the direct range of actuation of the operator.

A beam splitter 9 which in the illustrated example of embodiment comprises five beam splitter elements 9.1 to 9.5 assembled in a mounting or holder 10, which are displaceable transversely to the optical axes 5 and 8 within the casing 1 and form an indivisible unit, is situated at the point of intersection.

The displacement is performed by means of two push-rods 11 arranged to be operated from the outside, which may also be replaced by any appropriate mechanism. The beam splitter element 9.1 is constructed as an unobstructed passage, so that a total transmission occurs. Starting from the beam splitter element 9.1, the transmissive proportion diminishes successively in the following beam splitter elements 9.2 to 9.5 whilst the reflective proportion increases proportionately, the final beam splitter element being constructed as a deflector element 9.5, which has a total reflection with no transmission. The deflector element 9.5 may consequently be replaced by a mirror.

In the sequence of the beam splitter elements 9.1 to 9.5, it is possible to select transmissive and reflective actions in the ratios 100:0, 90:10, 50:50, 10:90 and 0:100. The position of the beam splitter 9 which is required in each case is determined by means of a spring-biassed detent element 12 which in each case has a ball engaged in a recess 13, which is allocated to each beam splitter element 9.1 to 9.5 and establishes a releasable hold.

The physician in charge will normally observe the endoscopic image during therapy on a monitor whereof the picture may for example be generated by means of a video camera coupled to the camera connector 4. A co-observer may at the same time also be provided with an image via the segmented optical system, and may view the same via the connector 7a. During the therapy, it will be decided for example whether a photographic camera should perhaps be coupled to the camera connector 7a, to produce a photographic exposure. For this case, the beam splitter system may be displaced so that the endoscopic picture is transferred to the beam path of the segmented optical system under total reflection by means of the deflector element 9.5. If, on the other hand, the video camera coupled to the camera connector 4 provides too dark a picture, the possibility exists of generating a brighter picture by displacing the beam splitter, to which end the unobstructed passage 9.1 may evidently also be placed in the beam path of the endoscopic image so that the latter may be supplied to the video camera with an optimum degree of brightness.

It should be appreciated that the invention is not limited to the embodiment herein described but includes all modifications and variations falling within its scope.

I claim:

1. In an ocular attachment for an endoscope, in which an endoscopic image may be split into two images by means of one in each case of several adjacently positioned beam splitter elements which are displaceable transversely to an image axis, one image being transmissible along said image axis acting as a first optical axis to a first camera connector and the other image being transmissible to a second camera connector via an image conductor along a second optical axis, to which end the degrees of brightness of both images being adjustable by means of the beam splitter elements having different transmission/reflection ratios and being secured in a mounting, one of the beam splitter elements being positionable in each case in the beam path of the endoscopic image by displacing the mounting, the improvement comprising means being provided in said mounting for supplying an undivided endoscopic image optionally to a selected one of the first and second optical axes.

2. In an ocular attachment according to claim 1, in which the mounting being releasably detained at the position selected in each case, by means of a detent element which is placed under initial stress by a spring and acts automatically.

3. In an ocular attachment according to claim 1, in which the image conductor is constructed as a segmented optical system.

4. In an ocular attachment according to claim 1, in which two eyepiece cones are provided at the extremities of the first and second beam paths respectively, and in which the two eyepiece cones form the camera connectors.

5. In an ocular attachment according to claim 1, wherein said means for supplying includes an unobstructed passage element with total transmission and a particular deflector element with total reflection, said mounting in one position has said passage element on said image axis to provide total transmission of the endoscopic image on the first optical axis to the first camera connector and in another position of the mounting the particular deflector element is on the image axis to provide a total reflection of the endoscopic image along the second optical axis to the second camera connector.

6. In an ocular attachment according to claim 1, which includes a guided push-rod being connected to said mounting and acting as a handle for linear displacement of the mounting.

7. In an ocular attachment according to claim 5, in which the particular deflector element is situated at one extremity of the mounting, whereas an unobstructed passage element is provided at the other extremity of the mounting, and in which by appropriate displacement of the mounting, the particular deflector element and the passage element may optionally be placed in the path of the endoscopic image.

8. In an ocular attachment according to claim 5, in which the mounting carries three beam splitter elements which are situated between the passage element and the particular deflector element and that the transmission/reflection ratios, starting from the passage element, through the three beam splitter elements and up to the particular deflector element inclusive, have at least approximately the following values, namely 100/0, 90/10, 50/50, 10/90 and 0/100 respectively.

9. An ocular attachment for an endoscope comprising a housing having means for forming a first image axis extending to a first connector, means for forming a second image axis extending perpendicular to the first image axis and extending to a second connector, said second axis intersecting said first axis, said housing having means for selectively positioning one of a plurality of optical elements at a point of intersection of the first and second axes, said optical elements including at least one beam splitter element and said optical elements including means for supplying an undivided endoscopic image to one of the first and second axes.

10. An ocular attachment according to claim 9, wherein the means for supplying an undivided endoscopic image includes a total image transmission element for transmission of the image on the first axis and a reflecting element for totally reflecting the light from the first axis to the second axis.

11. An ocular attachment according to claim 10, wherein at least two beam dividers having different divisional ratios are interposed in a mount between the reflecting element and the total transmission element.

12. An ocular attachment according to claim 11, wherein the housing has detent means for releasably detaining the mount in each of the selected positions to select one of the optical elements at the point of intersection, and the device includes push rods acting on the mount for displacing the mount linearly to position different optical elements at the point of intersection.

* * * * *